US006550745B2

(12) United States Patent
Bergstrom et al.

(10) Patent No.: US 6,550,745 B2
(45) Date of Patent: Apr. 22, 2003

(54) FLAT LAMINATION SOLENOID

(76) Inventors: Gary E. Bergstrom, 191 Miles Rd., Moreland Hills, OH (US) 44022; Joseph B. Seale, 98 Day Rd., Gorham, ME (US) 04038

( * ) Notice: Subject to any disclaimer, the term of this patent is extended or adjusted under 35 U.S.C. 154(b) by 0 days.

(21) Appl. No.: 09/740,770

(22) Filed: Dec. 19, 2000

(65) Prior Publication Data

US 2001/0030307 A1 Oct. 18, 2001

Related U.S. Application Data

(60) Provisional application No. 60/171,326, filed on Dec. 21, 1999.

(51) Int. Cl.[7] .................................... F16K 31/02

(52) U.S. Cl. .................................... 251/129.16

(58) Field of Search .................... 251/129.16, 129.15; 29/609

(56) References Cited

U.S. PATENT DOCUMENTS

| | | | | | |
|---|---|---|---|---|---|
| 3,608,585 | A | * | 9/1971 | Huntington | 137/625.65 |
| 3,633,139 | A | | 1/1972 | Thompson | |
| 4,169,234 | A | | 9/1979 | Yonkers | |
| 4,210,859 | A | * | 7/1980 | Meretsky et al. | 323/331 |
| 4,364,169 | A | * | 12/1982 | Kawano et al. | 219/93 |
| 4,619,028 | A | * | 10/1986 | Neuenschwander | 29/33 L |
| 5,002,166 | A | * | 3/1991 | Leigh-Monstevens et al. | 192/3.58 |
| 5,028,830 | A | * | 7/1991 | Mas | 29/598 |
| H982 | H | * | 11/1991 | Berggren et al. | 156/275.1 |
| 5,248,952 | A | * | 9/1993 | Bisbee | 156/291 |
| 5,359,309 | A | | 10/1994 | Juds et al. | |
| 5,515,818 | A | * | 5/1996 | Born | 123/90.11 |
| 5,992,003 | A | * | 11/1999 | Elliott et al. | 29/596 |
| 6,013,959 | A | * | 1/2000 | Hoppie | 310/12 |
| 6,195,525 | B1 | * | 2/2001 | Maeyama | 399/328 |

* cited by examiner

*Primary Examiner*—Kevin Shaver
*Assistant Examiner*—David A. Bonderer
(74) *Attorney, Agent, or Firm*—Pierce Atwood

(57) ABSTRACT

A variable reluctance solenoid includes an armature and a yoke located axially beyond one end of the armature. Magnetic attraction across an axial gap between the armature and yoke causes the armature to move axially and close the gap. The armature includes ferromagnetic laminations lying in a plane perpendicular to the axial direction. These laminations may include slots, proportioned and directed to combat eddy currents and reduce moving mass while avoiding creation of flux bottlenecks. The solenoid may have two yokes on opposite sides of the armature, providing reciprocating armature motion.

15 Claims, 4 Drawing Sheets

FLAT LAMINATION SOLENOID

CROSS REFERENCE TO RELATED APPLICATION

This application claims the priority benefit of U.S. provisional patent application Ser. No. 60/171,326, filed Dec. 21, 1999, of the same title and naming Gary Bergstrom as inventor.

FIELD OF THE INVENTION

This invention relates to solenoids using ferromagnetic armatures subdivided into laminations to reduce eddy current losses. It relates more specifically to a lamination stacking geometry that combines good electrical/magnetic properties with high mechanical strength. It further relates to the use of stacks of slotted laminations, to provide an armature with high strength, reduced weight, high flux handling, and low eddy current losses. This invention is applicable especially to actuation solenoids for automotive engine valves.

BACKGROUND OF THE INVENTION

Most solenoids are fabricated from iron or silicon steel alloys, where silicon alloying causes a large increase in electrical resistivity, which is traded off against a small decrease in flux handling capacity. Even with silicon steels, however, eddy current losses present significant performance problems in two broad classes of solenoids.

The first eddy-sensitive class is solenoids that are excited by AC rather than DC currents. AC excitation offers certain advantages, most notably, inductive self-limiting of current, so that an open AC solenoid pulls the high current needed to close, while the closed solenoid pulls a much lower current needed to maintain latching, the current reduction arising from the higher inductance of the closed solenoid. AC solenoids are generally constructed of laminations rather than solid metal, in order to reduce power dissipation by eddy currents and prevent overheating.

The second eddy-sensitive class is high performance solenoids that are excited by DC or pulse width modulated AC or DC and that are designed to move and be energized and de-energized very rapidly, often with a need for tight magnetic control or servo control of motion, and possibly actuated very frequently. Significant in this class are dual-acting solenoids used to open and close cylinder valves in automotive engines. Rapid energization and de-energization induces large eddy currents in unlaminated metal solenoids, with several adverse consequences. First is the matter of heating and power dissipation, which become significant for solenoids that are operated very frequently. Second is the dissipation-related issue of output capacity for the solenoid power supply and switching electronics—capacity that must be increased to overcome eddy current losses. Third is the issue of response speed, which is slowed when eddy currents oppose the magnetomotive force of winding currents. Eddy current phase lag and reduced response bandwidth compromise both the speed and precision achievable with servo control.

While tubular solenoids and open-frame solenoids using a single bent piece of metal are common in DC and low performance applications, stacked laminations in an "E-I" or "U-I" configuration are typical of laminated designs, as illustrated respectively in FIGS. 1 and 2 by assemblies 101 and 201. The "E" core yoke of FIG. 1 includes both E-shaped yoke laminations and a single electrical winding, 120, drawn with a smooth outer surface (e.g., a paper wrapping) and a circular or spiral pattern visible on the bottom of the winding. The "U" core yoke at 201 of FIG. 2 includes U-shaped laminations and two electrical windings, 220 and 225, shown surrounding the two legs of the "U". These two windings are typically wired either in series or in parallel with reinforcing magnetomotive forces, promoting the flux loop through the "U" and "I" cores and across the gaps of width indicated at 240. The moving armature element in a laminated solenoid may consist of a stack of "I" laminations forming a flattened rectangle, e.g., armature 130 of FIG. 1 or armature 230 of FIG. 2. The typical mechanical solenoid configuration is similar to transformer configurations, except that in a transformer the "I" laminations are placed on alternating sides so that the "E" or "U" laminations interleave with the "I" laminations. In a solenoid, the laminations do not interleave, and the "I" laminations are all stacked on one side as a moveable armature, as shown with 130 and 230, or else a solid slab of metal substitutes for the "I" lamination stack. Magnetic flux travels in a loop around the box formed by a "U-I" pair of lamination stacks, as through yoke 210, across air gap 240, into armature 230, back across gap 240 on the opposite side, and returning to 210 to complete the circuit. As the armature moves axially to close gap 240, the reluctance of the magnetic circuit excited by windings 220 and 225 is reduced, reaching a minimum when the armature approaches or contacts the yoke, closing the magnetic circuit with minimal air gaps. In the case of an "E-I" pair, the flux path describes a pair of loops, going through the center of the "E", e.g., of 110, across gap 140 to armature 130, splitting into separate paths to travel to the ends of 130, back across gap 140 to the outer fingers of 110, and completing the circuit as the separate flux paths converge back to the middle of 110. In either the "U-I" or "E-I" configuration, most flux completes a full loop within the plane of individual pairs of laminations of the yoke and armature. Eddy currents induced by such a flow of magnetic flux tend to circulate in a plane perpendicular to the direction of the B-field. Since the B-field itself flows in the parallel and typically flat planes of the laminations, the plane in which eddy current loops tend to circulate is chopped up by the laminations, as is desired so that the laminations inhibit the eddy currents.

The disadvantage of an armature consisting of a relatively deep stack of narrow "I" laminations is that it is inherently weak against bending moments in a direction tending to cause separation of the laminations. In the "E-I" configuration of FIG. 1, it may be necessary to reinforce and strengthen the armature in various ways that add weight and, sometimes, introduce undesirable eddy current paths, partially defeating the function of the laminations. In engine valve solenoids, common practice has been to use a solid unlaminated armature, accepting the penalty in eddy current performance in order to achieve strength. Thus, there are inherent difficulties in achieving a mechanically robust armature using laminations to good advantage.

Note that the figures do not show components for coupling solenoid armatures to a mechanical load. Typically, a shaft would connect to, or penetrate through, the center of the armature lamination stack of FIG. 1 or of FIG. 2. The figures omit these details to focus attention on the configuration of magnetic lamination material.

The prior art offers examples of armature laminations stacked in a plane perpendicular to the axial direction of motion, but not in solenoids structurally or functionally similar to the present invention. As will be shown, the present invention relates to variable reluctance actuators in which an armature closes an axial magnetic gap with a yoke structure. Magnetic reluctance in such solenoids changes abruptly with the closure or near-closure of that axial gap, producing rapid armature flux changes acting strongly to produce eddy currents. It is characteristic of such solenoids to exert high forces over short ranges near closure, with highly nonlinear characteristics. It is also characteristic of such solenoids to produce high bending stresses in their relatively thin rectangular or disk-shaped armatures. In U.S. Pat. No. 4,395,649, Thome et al. illustrate a solenoid adapted for inducing vibrations, based not on axially disposed armature and yoke with a closing axial gap, but rather on radially-disposed armature and yoke with a non-closing radial gap. The variation of reluctance with armature position is smooth, not abrupt, avoiding the abrupt shifts in magnetic flux that tend strongly to excite eddy currents in Applicant's context. Thome et al. do not discuss the relationship between lamination orientation and eddy currents. The armature taught by Thome et al. is a relatively deep cylinder, not a thin rectangle or disk, so that bending stresses in the armature are not an issue. In U.S. Pat. No. 6,013,959, Hoppie describes a linear motor whose principal mode of force generation is interaction of time-varying yoke magnetic fields with permanent magnet fields in the armature. Variable reluctance plays a minor role in Hoppie's system, in contrast to Applicant's system, which lacks permanent magnets and relies entirely on variable reluctance. Like the system of Thome et al., the moving armature laminations of Hoppie slide back and forth past the concentric edge of the stator, and these laminations are in deep cylindrical stacks axially supported by permanent magnets and end caps, so that bending stresses are not an issue. The choice to stack armature lamination disks axially appears to be at least partly a matter of fabrication ease, as noted by Hoppie in related U.S. Pat. No. 6,039,014, which states: " . . . ideal laminations would be pie-shaped segments extending the entire length of the actuator. In practice, such laminations are difficult to produce." The same pragmatic concern probably motivates the structure of Thome et al.

OBJECTS OF THE INVENTION

It is an object of the invention to provide a solenoid armature made of laminations, such that the planes of the laminations lie flat in a plane perpendicular to an axial direction of motion of the armature. Laminations in such an orientation will henceforth be described as "flat" or "lying flat", phrases intended here to indicate an orientation perpendicular to an axis of armature motion, rather than simply describing the laminations as planar. A further related object is to make a flat lamination armature strong, to resist bending moments associated with axial forces of electromagnetic attraction and of mass acceleration and of pole face impact. A still further object is to orient laminations so that they inhibit induced eddy currents. To supplement the effect of flat laminations and inhibit eddy currents induced within a flat armature lamination plane by axial components of changing magnetic flux, it is an object to optionally provide slots in those laminations, especially in regions where there is a significant component of changing magnetic flux traveling through the thickness dimension of the laminations. A related object is to cause slots to fall into alternating positions for alternate laminations, so that an adhesive can bind all the laminations of an armature into a rigid solid containing isolated internal voids or separated slots that inhibit eddy currents and reduce weight while maintaining high mechanical strength. It is an object to shape and distribute slots so as to not reduce the flux handling capability of the armature. It is an object to employ flat laminations in armatures, possibly including slots, in conjunction with yoke geometries characterized by the descriptive phrases "U-core" and "E-core" and "pot core."

LIST OF FIGURES

Figure 5:
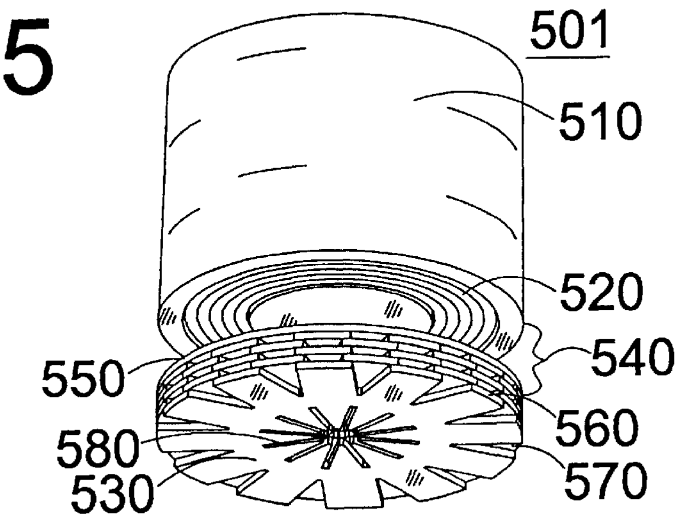
FIG. 5 shows a pot core solenoid whose armature includes slotted laminations stacked flat.
Figure 5A:
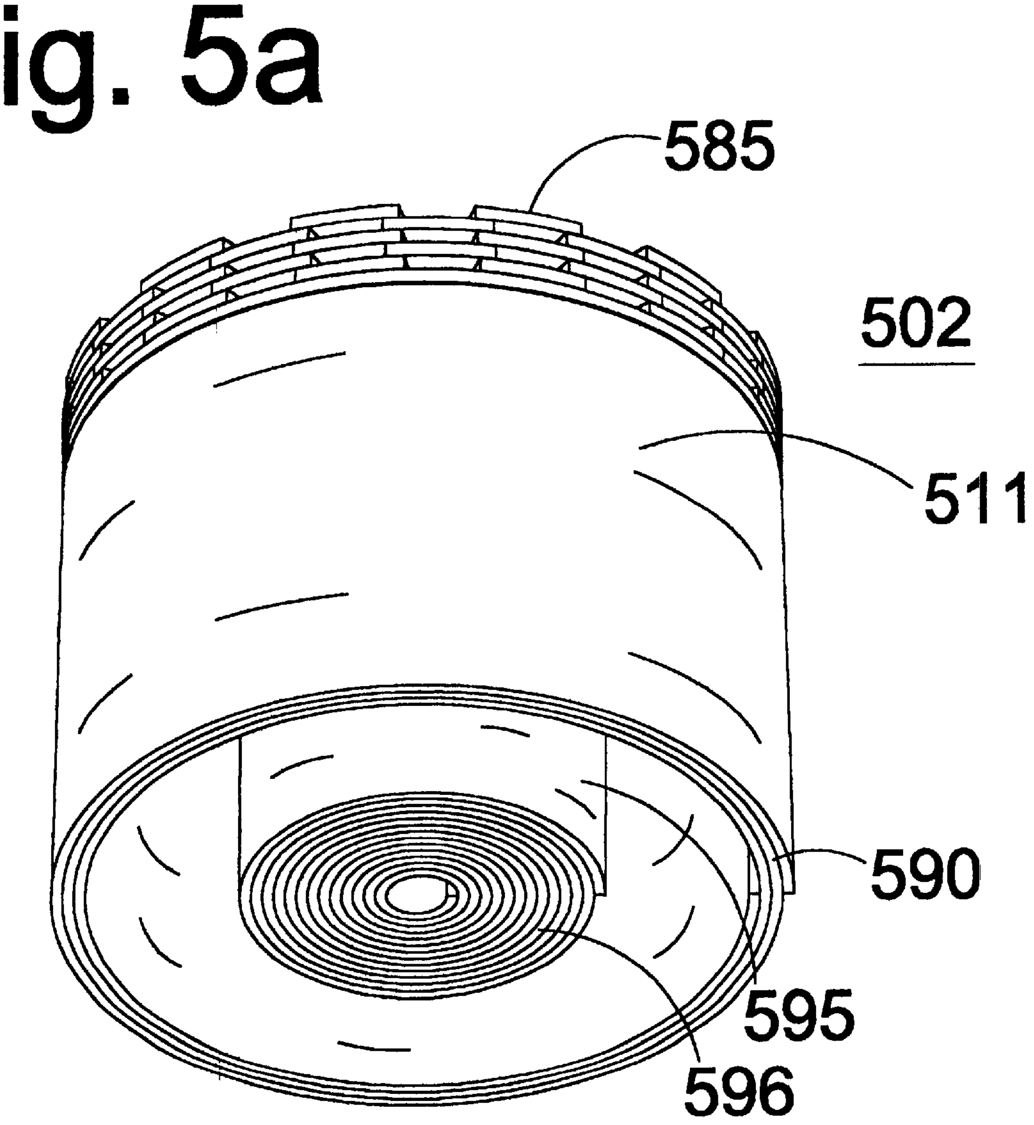

FIG. 5*a* shows the ferromagnetic component of a yoke similar to that of FIG. 5, but modified to include spiral wound laminations in the middle and slotted disk laminations on the closed end.

Figure 3:
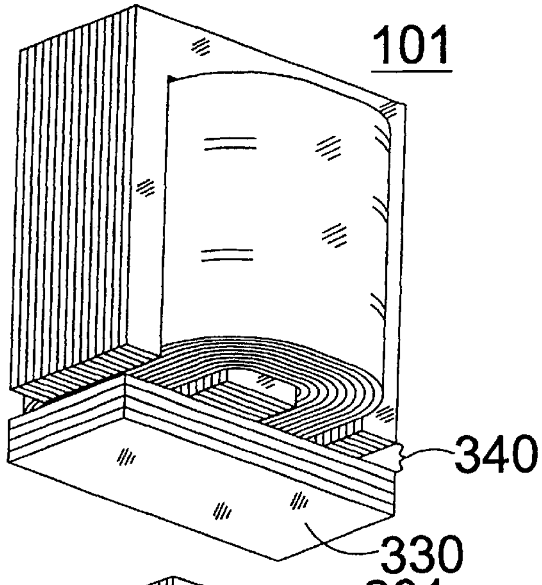
FIG. 3 shows the configuration of FIG. 1 modified so that the armature laminations lie flat.
Figure 6:
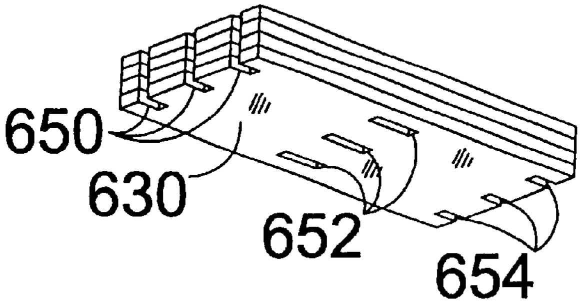

FIG. 6 shows the armature of FIG. 3, modified to include slots.

Figure 4:
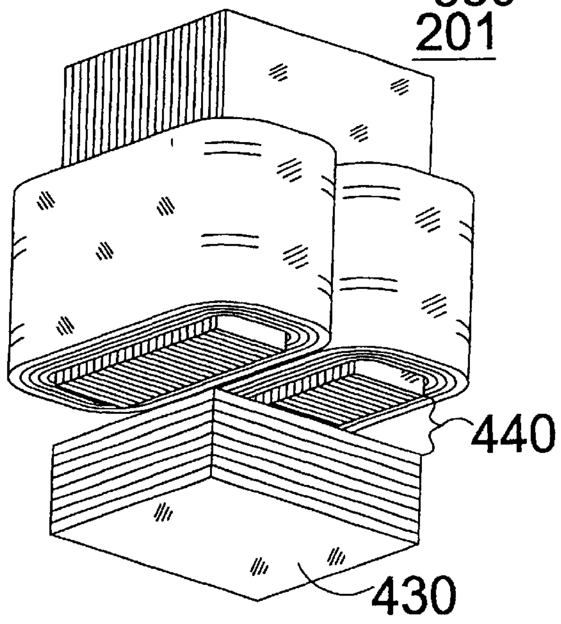
FIG. 4 shows the configuration of FIG. 2, modified so that the armature laminations lie flat.
Figure 7:
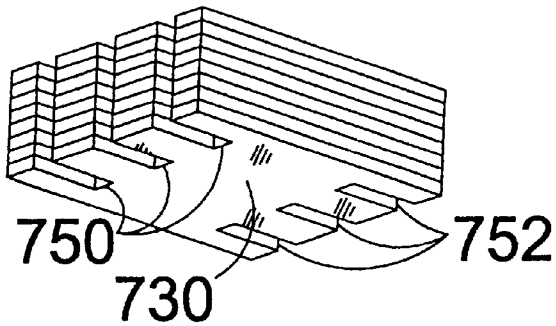

FIG. 7 shows the armature of FIG. 4, modified to include slots.

Figure 8:
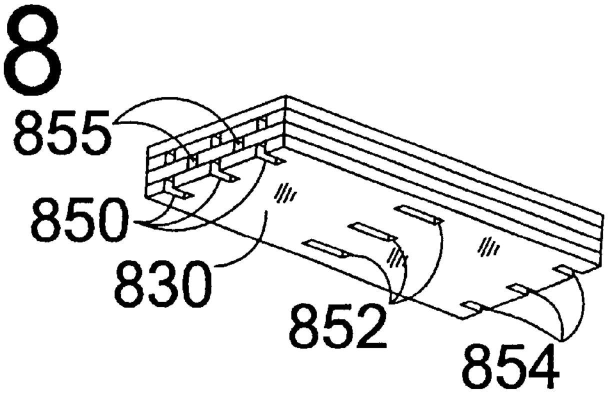

FIG. 8 shows the armature of FIG. 6, modified so that the slot positions are different for adjacent laminations, leaving isolated voids in the armature.

Figure 9:
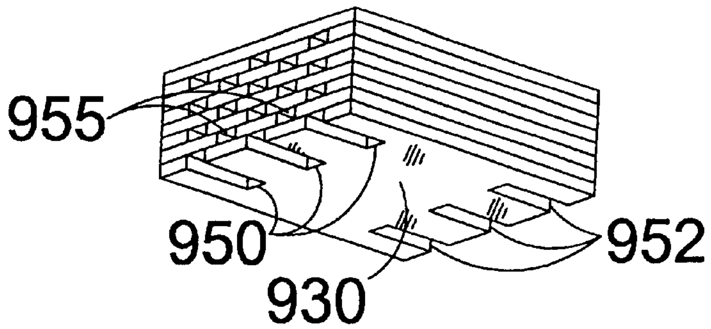

FIG. 9 shows the armature of FIG. 7, modified so that the slot positions are different for adjacent lamination, leaving isolated voids in the armature.

BRIEF SUMMARY OF THE INVENTION

While laminated solenoid configurations of the prior art are successful at reducing eddy current losses to a low level, conventionally laminated armatures of such solenoids are difficult to make strong. If an armature of substantially the same external shape is fabricated from laminations lying "flat" in a horizontal plane, perpendicular to the axial direction of armature motion, then the armature becomes quite strong when the laminations are joined together, e.g., by vacuum impregnation with an adhesive, or by pins, welds, soldering, etc. A flat orientation introduces two minor disadvantages: it introduces extra magnetic reluctance since flux must cross the thin insulating layers between laminations; and it makes the laminations slightly less effective at inhibiting eddy currents. Much of that small loss in eddy current inhibition can be restored by including slots in the laminations, extending parallel to the desired magnetic flux pathways in the lamination planes. The slots are needed only under the yoke pole pieces, where magnetic flux enters and penetrates the armature across the thicknesses of the flat laminations. No slots are needed where armature flux is traversing laterally between areas under pole faces, since the axial magnetic field component in these in-between areas is quite small. To reduce armature mass, slots may widen, or more slots may be added, near the outside perimeter of an armature, where there is not much buildup of magnetic flux in the material. Lamination layers at or close to a surface of pole-face mating may be left un-slotted to maintain a high poleface contact area for a high latching force, while underlying laminations may be slotted, especially in regions of low flux density, yielding an advantageous reduction in armature weight while helping to minimize eddy currents. Flat lamination configurations, with or without slots, can be applied as modifications to the common yoke-armature configurations: "U-I", "E-I", and circular "Pot Core" combinations. Flat lamination armatures can be used to advantage in double-acting solenoids, where a single armature travels between opposing yoke faces, e.g., in topologies for electrically actuated automotive valves.

DESCRIPTION OF PREFERRED EMBODIMENTS

Figure 1:
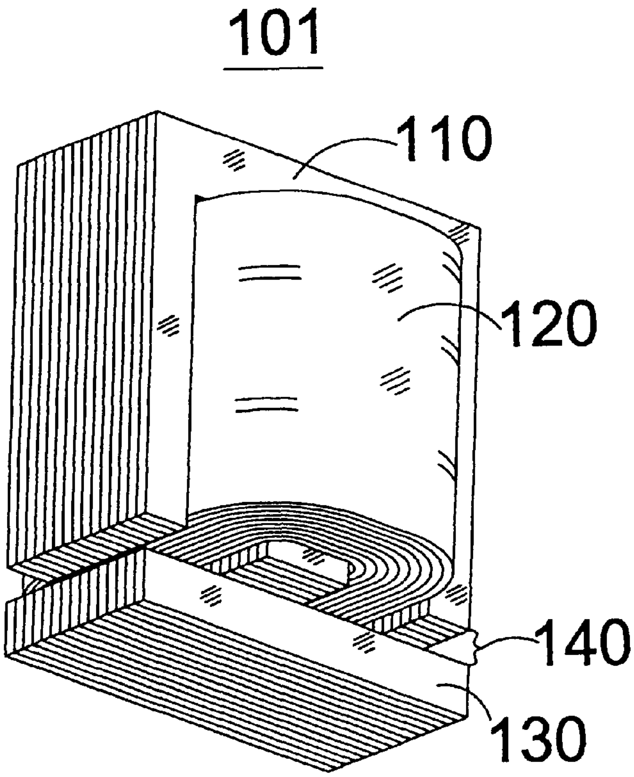
Fig. 1 (prior art)
FIG. 1 shows an "E-I" solenoid configuration of the prior art.

Starting from the prior-art "E-I" topology of FIG. 1, FIG. 3 shows the same stator structure 101, including the yoke and winding, along with a gap 340 analogous to gap 140 between the yoke and armature of FIG. 1. Armature 330 is seen to include laminations lying in a "flat" or horizontal plane, perpendicular to the axis of armature motion. If the laminations are joined by a strong adhesive, the armature becomes extremely rigid and strong. Mechanical connection to 330 might be accomplished by drilling through the middle and attaching a shaft through the armature. The many alternatives for mechanical connection are not discussed here, nor are they illustrated.

Figure 2:
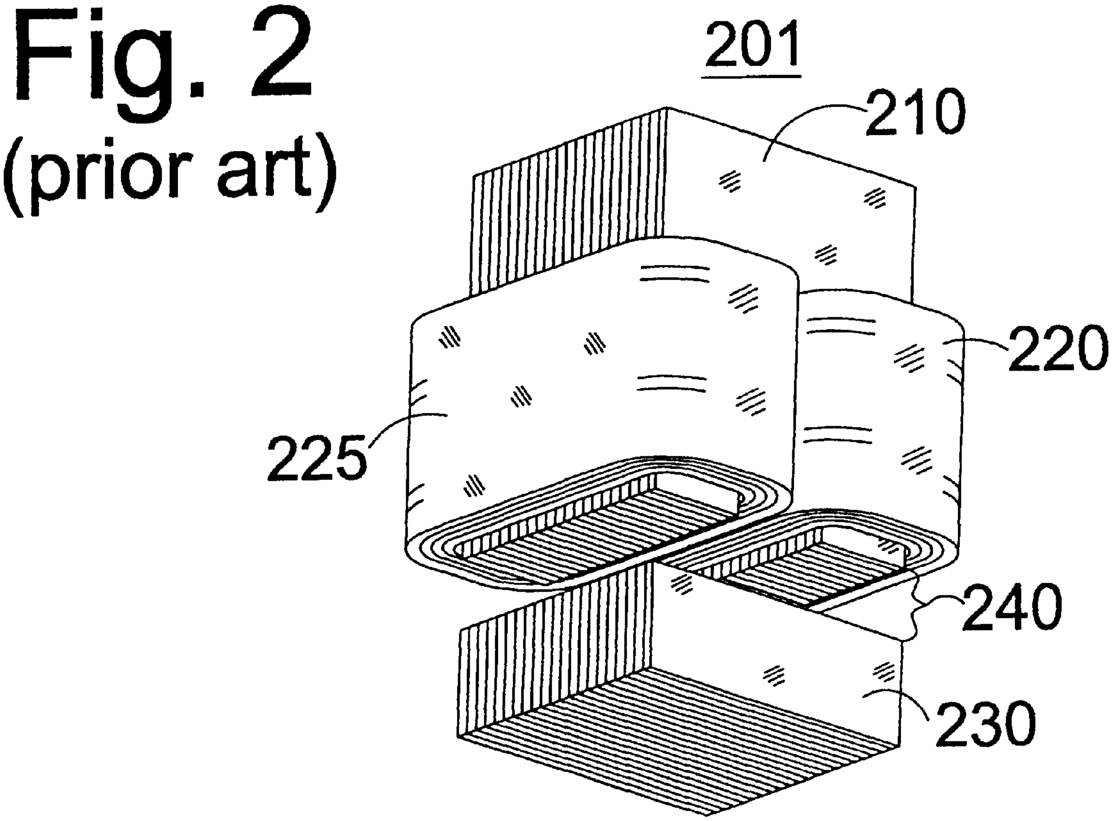
Fig. 2 (prior art)
FIG. 2 shows a "U-I" solenoid configuration of the prior art.

Starting similarly from the prior-art "U-I" topology of FIG. 2, FIG. 4 shows the same stator structure 201, including the yoke and windings, along with a gap 440 analogous to gap 240. Like 330, armature 430 is seen to include laminations that are "flat," i.e. lying in a plane perpendicular to the axis of armature motion.

A variation on the topology of FIG. 3 is to form a surface of revolution from an E-I core shape, arriving at a "pot-core" solenoid topology as illustrated in FIG. 5. The stator structure 501 includes ferromagnetic yoke 510 enclosing a winding 520, which lies between the center post and the outer shell of 510, with a solid disk of ferromagnetic material (not visible from the exterior view) at the top, bridging between the center post and outer shell. Armature 530 is a disk, pulled in electromagnetically to bridge between the center post and the outer shell, thus closing the open pot core and completing a flux loop resembling a torus enclosing the electrical winding. 530 is seen to include lamination layers, including an unslotted disk lamination 550 mating with the open lower end of 510, and additional slotted laminations like bottom lamination 560. 570 is one of many wedge-shaped slots coming radially inward from the outer perimeter of the slotted laminations. Since the increase in disk radius going from the inner post of 510 outward normally causes flux density to decrease radially, slots like 570 can be used to reduce the armature moving mass, thus increasing actuation speed while not creating flux bottlenecks. 580 indicates a pattern of narrow slots radiating outward from the center of 530, blocking eddy currents that would otherwise tend to circulate in a horizontal plane under the center post of 510 when flux is changing rapidly. The small amount of flux coming from the innermost portion of the inner post of 510 travels entirely in the unslotted top lamination 550 of 530, where the radial slots of 530 converge to create a central hole in the lower laminations. As flux progresses radially outward and the total radial flux increases due to axial flux arriving from the center post of 510, the radial slots of 580 occupy a decreasing fraction of the ferromagnetic real estate, until the slots terminate near the outer perimeter of the center post.

FIG. 5*a* shows a ferromagnetic structure 502 for a yoke analogous to yoke 510, but incorporating improvements to reduce eddy currents. 502 includes a cap 585, a cylindrical body 511, and an inner cylindrical post 595. An electrical winding like 520 goes in the annular cavity inside 511 and outside 595. Cap 585 is constructed of slotted laminations stacked flat, like armature 530, only in this case 585 is a stator component opposite the armature, which is not shown in FIG. 5*a* but would close against the downward-facing open end of 502. As seen on the lower edge 590 of cylindrical body 511, this wall consists of a single spirally wound lamination sheet. Similarly viewed on the lower edge 596 of 595, this post consists of another single spirally wound lamination sheet. Primarily axial flux through 511 and 595 tends to induce circumferential eddy currents, which are prevented except for weak localized eddies by the lamination structure. Flux crossing lamination thicknesses to enter and leave cap 585, where it buts against 511 and 595, drives eddy currents that are inhibited by radial slots cut in the lamination disks. Flux traveling radially in the plane of the layers of 585, between 511 and 595, drives eddy currents that are inhibited by the insulation between laminations. Thus, equipped with a winding similar to 520 and an armature similar to 530, the "pot core" structure of FIG. 5*a* leads to a solenoid with low moving mass and low eddy current losses throughout. An axial shaft would typically complete the design, traveling through a central hole in 585 (like the hole in 530), through the center hole of 595, and coupling into a central hole in an armature like 530.

FIGS. 6, 7, 8, and 9 illustrate variations of slot geometry for armatures 330 and 430. FIG. 6 shows armature 630, a variation on the "E-I" armature 330, including end slots 650, central slots 652, and opposite end slots 654. In the preferred geometry illustrated, the end slots extend inward less than the width of the outer polefaces of the E-core yoke, so that they do not occupy critical flux-carrying real estate where the entire flux from an outer armature leg must flow. For similar reasons, the inner slots 652 do not extend outward to the full width of the center leg of the E-core. Ideally the slots would taper from wide at the ends and center, where the flux is lowest, to narrow or non-existent in the regions where the flux is highest.

FIG. 7 shows armature 730 as a slotted variant of armature 230, with slots 750 on one end and slots 752 on the opposite end, analogous to slots 650 and 654. In a "U-I" core topology, there is no center post and therefore no central slots like 652. Without axial flux entering the middle of the armature, there is no need for central slots to combat eddy currents.

In FIG. 8, armature 830 is like armature 630, with some of the laminations slotted exactly like the laminations of 630. Slots 850 are like slots 650, slots 852 like 652, and slots 854 like 654. These slots in the bottom layer of 830 do not meet similar slots in the next lamination above. Instead, slots 855, seen only at their ends, penetrate like slots 850 but in different, non-overlapping locations. An alternation of layers with different slot patterns continues to the top lamination, which is unslotted for complete mating with the yoke polefaces.

In FIG. 9, armature 930 is like armature 730, with slots 950 and 952 in the lowest lamination being like slots 750 and 752 for the lowest lamination of 730. As with armature 830, the slots seen in the bottom of 930 do not continue upward, uninterrupted, through the laminations, but alternate with different slot patterns, like 955 above slots 950. As with 830, the uppermost lamination of 930 is unspotted.

In armatures 530, 830, and 930, slots alternate in position for different laminations so that the armatures contain isolated voids filled, e.g., with air or adhesive, while a continuous bridging of lamination material around the voids binds the armatures into very strong structures. Properly shaped and placed, the slots not only afford substantial reductions in eddy currents, but also significant weight reductions. With or without slots, these flat lamination armatures exhibit great strength and rigidity, offer ease and economy of fabrication from stampings, and far outperform solid metal armatures, approaching but not matching the eddy current performance of the vertical plane laminations of 130 and 230. In the case of pot core solenoid topologies, lamination geometries are more difficult—the ideal of radial laminations, flat in vertical planes, does not work for stacking. Tape-wound armature disks have most of the flux passing through tape thicknesses rather than in the planes of the tape windings. Thus, a spiral-wound tape armature suffers from high eddy current losses associated with radial components of magnetic flux. For pot core solenoids, therefore, the slotted flat-lamination armature is a very effective and practical configuration. An effective pot core yoke configuration may be formed as a tape-wound outer cylinder and tape-wound center post, each joined to a slotted flat-lamination end cap similar to armature 530, only flipped over to close the top end of 510.

The principles and features of the present invention, described in examples above, will be understood more broadly from the following claims. The claims are intended to cover the invention as described and all equivalents.

I claim:

1. A solenoid comprising a yoke and a ferromagnetic armature capable of axial motion with respect to said yoke, wherein:

a) said armature approaches said yoke at a limit of said axial motion;

b) a magnetic flux path through said armature and said yoke achieves a minimum reluctance at said limit of said axial motion; and, c) wherein said armature is subdivided into laminations lying in planes perpendicular to the axis of said axial motion.

2. The solenoid of claim 1 wherein:

a) said yoke includes a first part and second part;

b) said limit of said axial motion is a first limit, said armature approaching said first part at said first limit; and, c) wherein when said armature approaches said second part at a distinct second limit of said axial motion.

3. The solenoid of claim 1, wherein:

a) said yoke includes a ferromagnetic U-core and an electrical winding;

b) said armature is rectangular; and, c) wherein when said armature approaches the two ends of said U-core, a substantially closed ferromagnetic loop is formed.

4. The solenoid of claim 3, wherein at least one of said laminations includes slots extending from two opposing sides of the rectangle of said rectangular armature toward the region of said armature landing between said two ends of said U-core.

5. The solenoid of claim 1, wherein:

a) said yoke includes a ferromagnetic E-core and an electrical winding;

b) said armature is rectangular; and, c) wherein when said armature approaches the three ends of said E-core, a pair of substantially closed ferromagnetic loops is formed.

6. The solenoid of claim 5, wherein at least one of said laminations includes slots extending from two opposing sides of the rectangle of said rectangular armature toward the middle end of said three ends of said E-core.

7. The solenoid of claim 6, further including laminations with slots extending from the middle of said rectangle toward said two opposing sides of said rectangle.

8. The solenoid of claim 1, wherein:

a) said yoke includes a ferromagnetic pot core and an electrical winding;

b) said armature is circular; and, c) wherein when said armature approaches a center post and an outer region of the open end of said pot core, a substantially closed toroidal magnetic loop is formed.

9. The solenoid of claim 8, wherein said laminations include laminations with slots extending radially inward from the perimeters of said laminations.

10. The solenoid of claim 9, further including laminations with slots extending radially from a central region.

11. A cylindrical solenoid, including a cylindrical ferromagnetic structure fabricated from spirally wound sheet.

12. The solenoid of claim 11, wherein said cylindrical ferromagnetic structure is a central post surrounded by an electrical winding.

13. The solenoid of claim 11, wherein said cylindrical ferromagnetic structure is a hollow cylindrical body surrounding an electrical winding.

14. The solenoid of claim 11, wherein a central post and outer cylinder are bridged by a flat ferromagnetic cap including laminations lying perpendicular to the axis of armature motion.

15. The solenoid of claim 14, wherein said flat ferromagnetic cap includes radial slots.

* * * * *